US012307943B2

(12) United States Patent
Shin

(10) Patent No.: US 12,307,943 B2
(45) Date of Patent: May 20, 2025

(54) DISPLAY DEVICE

(71) Applicant: LG ELECTRONICS INC., Seoul (KR)

(72) Inventor: Sang Eui Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/465,468

(22) Filed: Sep. 12, 2023

(65) Prior Publication Data

US 2024/0412679 A1 Dec. 12, 2024

(30) Foreign Application Priority Data

Jun. 9, 2023 (KR) ........................ 10-2023-0073964

(51) Int. Cl.
*G09G 3/20* (2006.01)

(52) U.S. Cl.
CPC ..... *G09G 3/2096* (2013.01); *G09G 2330/021* (2013.01); *G09G 2330/06* (2013.01)

(58) Field of Classification Search
CPC ........... G09G 3/2096; G09G 2330/021; G09G 2330/06
See application file for complete search history.

(56) References Cited

U.S. PATENT DOCUMENTS

2011/0316449 A1* 12/2011 Imanaka ............ H05B 41/2828 315/307
2014/0138136 A1* 5/2014 Ahn ..................... H05K 3/3442 361/301.4
2014/0174806 A1* 6/2014 Park ......................... H01G 2/06 361/321.2
2023/0006482 A1* 1/2023 Choi ....................... H02J 50/12
2023/0040041 A1* 2/2023 Jin ......................... H03F 1/0277
2023/0063671 A1* 3/2023 Song ........................ H04L 27/04
2023/0216406 A1* 7/2023 Do ....................... G09G 3/3696 345/211
2023/0309023 A1* 9/2023 Lee ....................... H04W 52/32
2023/0412001 A1* 12/2023 Kim .................... H02M 1/0077

FOREIGN PATENT DOCUMENTS

KR 10-2007-0111759 11/2007

* cited by examiner

*Primary Examiner* — Ibrahim A Khan
(74) *Attorney, Agent, or Firm* — LEE, HONG, DEGERMAN, KANG & WAIMEY

(57) ABSTRACT

Disclosed is a display device including a power supply circuit that supplies a DC voltage or a burst wave voltage to the display device as power, a microphone that senses noise of the display device, and a controller that obtains a magnitude of the noise and adjusts a slope of the burst wave voltage for the power supply circuit based on the magnitude of the noise.

10 Claims, 12 Drawing Sheets

FIG. 9

| SLOPE(V/ms) | SENSITIVITY EVALUATION |
|---|---|
| 0.428 | 1.2 |
| 1.783 | 1 |
| 3.273 | 2.4 |
| 4 | 2.6 |
| 4.16 | 3 |
| 4.16 | 2.6 |
| 4.326 | 2.6 |
| 4.415 | 2.8 |
| 4.894 | 3.2 |
| 5.179 | 4.3 |

| FIRST SWITCH | SECOND SWITCH | THIRD SWITCH | EQUIVALENT CAPACITANCE |
|---|---|---|---|
| Off | Off | Off | 470uF |
| On | Off | Off | 940uF |
| On | On | Off | 1410uF |
| On | On | On | 1880uF |

DISPLAY DEVICE

CROSS-REFERENCE TO RELATED APPLICATION(S)

Pursuant to 35 U.S.C. § 119 (a), this application claims the benefit of earlier filing date and right of priority to Korean Patent Application No. 10-2023-0073964, filed on Jun. 9, 2023, the contents of which are all hereby incorporated by reference herein in their entireties.

BACKGROUND OF THE INVENTION

1.Field of the Invention

The present disclosure relates to a display device. Specifically, the present disclosure relates to a display device for minimizing noise caused by a supply voltage.

2. Discussion of the Related Art

Digital TV services using wired or wireless communication networks are becoming common. Digital TV services are capable of providing various services that could not be provided by the existing analog broadcasting services.

IPTV and smart TV services may provide various additional services, such as Internet search, home shopping, online games, etc., based on such interactivity.

A TV may use a DC voltage while the TV is providing service. Meanwhile, the TV may use a burst wave voltage to reduce power consumption in a standby state in which the user does not use the TV.

However, when the TV uses a burst wave voltage, acoustic noise of various frequencies and various intensities may occur according to the design of the TV. Accordingly, inconvenience may be caused to the user. Meanwhile, even if the design of the TV is changed, it may be difficult to significantly reduce the magnitude of noise due to the burst wave voltage.

In addition, when using DC voltage to solve the noise issue, it is difficult to save power consumption.

SUMMARY OF THE INVENTION

An object of the present disclosure is to minimize noise caused due to a voltage of power supplied to a display device.

A display device according to the present disclosure includes a power supply circuit configured to supply a DC voltage or a burst wave voltage to the display device as power a microphone configured to sense noise of the display device and a controller configured to obtain a magnitude of the noise and adjust a slope of the burst wave voltage for the power supply circuit based on the magnitude of the noise.

A display device according to the present disclosure may adjust a slope of the burst wave voltage to be smaller as an obtained magnitude of the noise increases.

A display device according to the present disclosure may adjust a slope of the burst wave voltage to a second slope smaller than a first slope when a magnitude of the noise obtained while the burst wave voltage having the first slope is being supplied is equal to or greater than a preset reference magnitude.

A display device according to the present disclosure, a power supply circuit includes a plurality of capacitors connected to at least one of a plurality of switches, and a controller may adjust the slope of the burst wave voltage by adjusting an equivalent capacitance of the plurality of capacitors.

A display device according to the present disclosure may adjust an equivalent capacitance of the capacitors to be larger as a magnitude of the noise increases.

A display device according to the present disclosure may adjust an equivalent capacitance of the capacitors to a second capacitance greater than a first capacitance when a magnitude of the noise obtained while the equivalent capacitance of the capacitors is a first capacitance is equal to or greater than a preset reference magnitude.

A display device according to the present disclosure, a plurality of capacitors includes first to fourth capacitors connected in parallel to an output terminal of the power supply circuit, and a plurality of switches includes a first switch connected between a first capacitor and a second capacitor, a second switch connected between a second capacitor and a third capacitor, and a third switch connected between a third capacitor and a fourth capacitor, and a controller may adjust an equivalent capacitance of the plurality of capacitors by controlling the plurality of switches individually.

A display device according to the present disclosure may turn off all of a plurality of switches when a magnitude of the noise is a first magnitude, turn on a first switch when the magnitude of the noise is a second magnitude greater than the first magnitude, turn on the first switch and a second switch when the magnitude of the noise is a third magnitude greater than the second magnitude and turn on all of the plurality of switches when the magnitude of the noise is a fourth magnitude greater than the third magnitude.

A display device according to the present disclosure may adjust a slope of the burst wave voltage to a first slope when a power-off input is received, and adjust the slope of the burst wave voltage to a second slope smaller than the first slope when a predetermined reference time has elapsed from a time when a power-off input is received.

A display device according to the present disclosure may adjust a slope of the burst wave voltage based on a time band in which a power-off input is received.

According to the present disclosure, it is possible to minimize noise caused by a voltage of a power supply regardless of the type of a main board of a display device.

According to the present disclosure, it is possible to minimize noise caused by a voltage of a power supply while minimizing power consumption in a standby state of a display device.

The burst wave voltage will be described with reference to FIG. 5.

Figure 6:
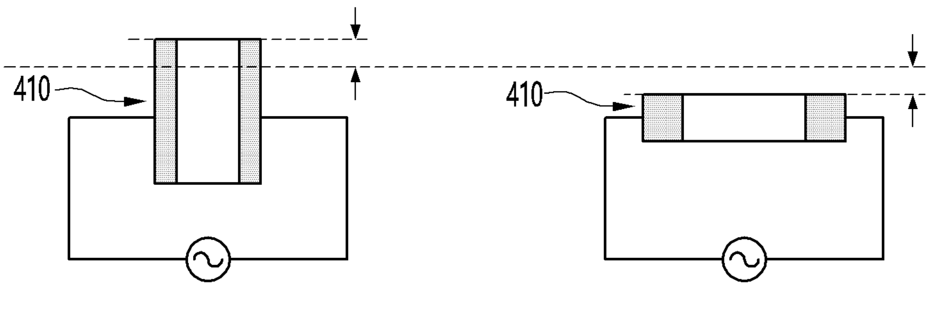

FIG. 6 is a diagram showing how the MLCC is charged or discharged.

Figure 7:
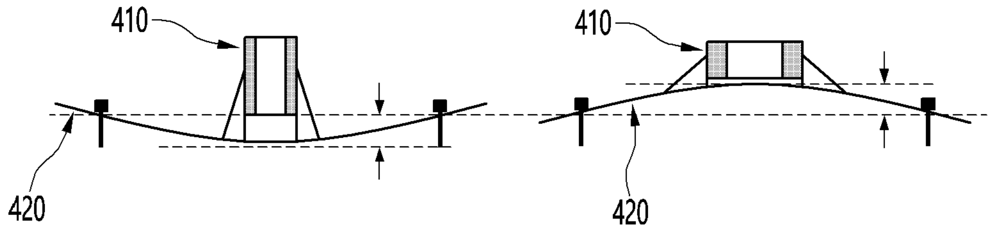

FIG. 7 is a diagram showing how the PCB expands or contracts according to whether the MLCC is charged or discharged.

Figure 8:
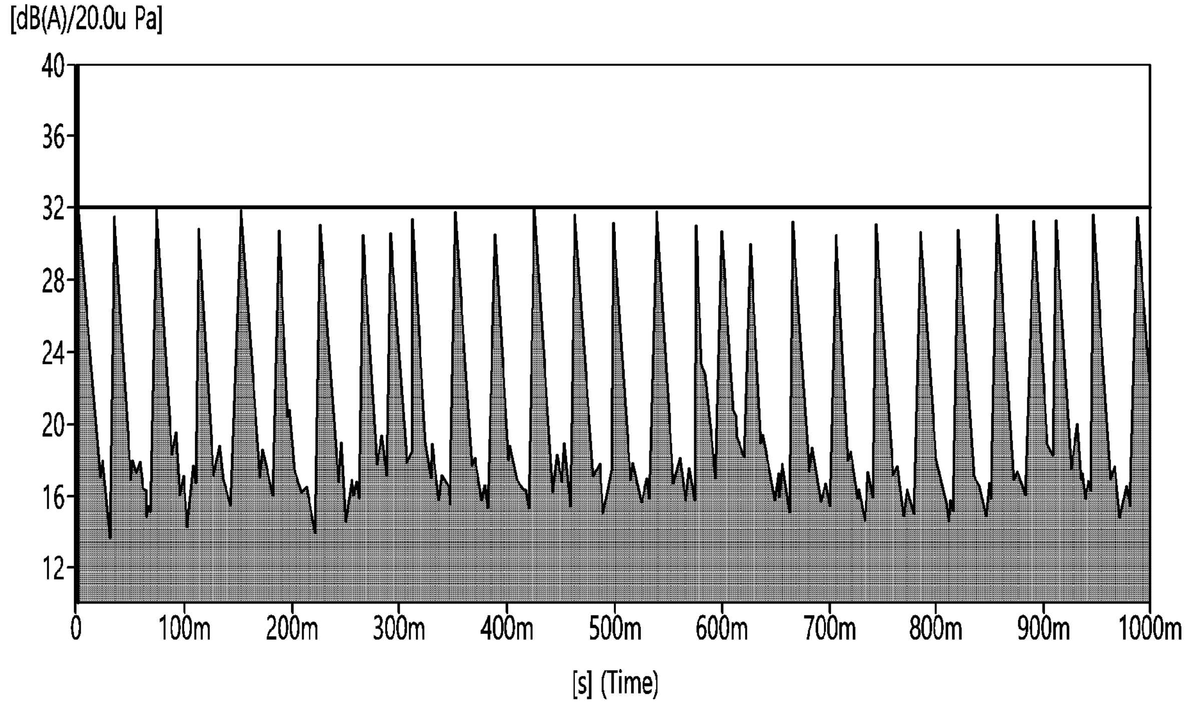

FIG. 8 is a diagram showing an example of a waveform of noise occurring due to vibration of a PCB.

FIG. 9 is a table showing sensitivity evaluation results of noise of the display device according to the slope of the burst wave voltage.

Figure 10:
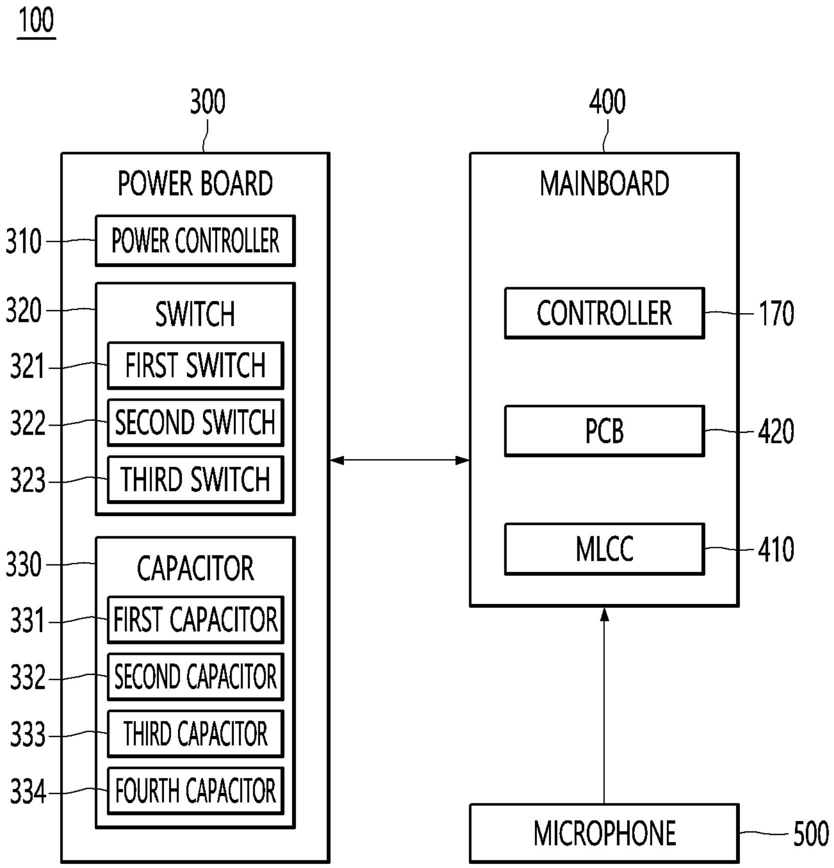

FIG. 10 is a control block diagram of a display device according to an embodiment of the present disclosure.

Figures 11, 12:
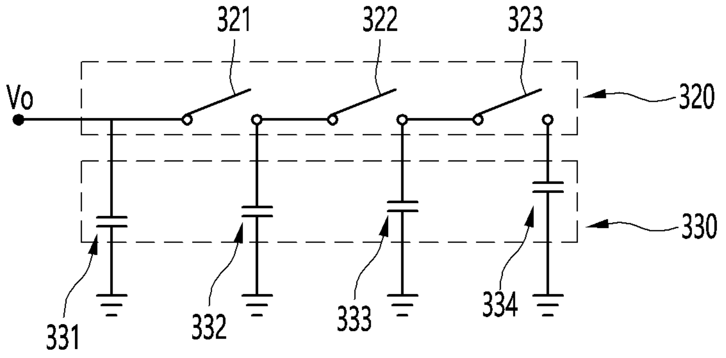

FIG. 11 is a diagram illustrating arrangement of a plurality of switches and a plurality of capacitors of a display device according to an embodiment of the present disclosure.

FIG. 12 is a table showing equivalent capacitances of a plurality of capacitors according to the on or off of each of a plurality of switches.

Figure 13:
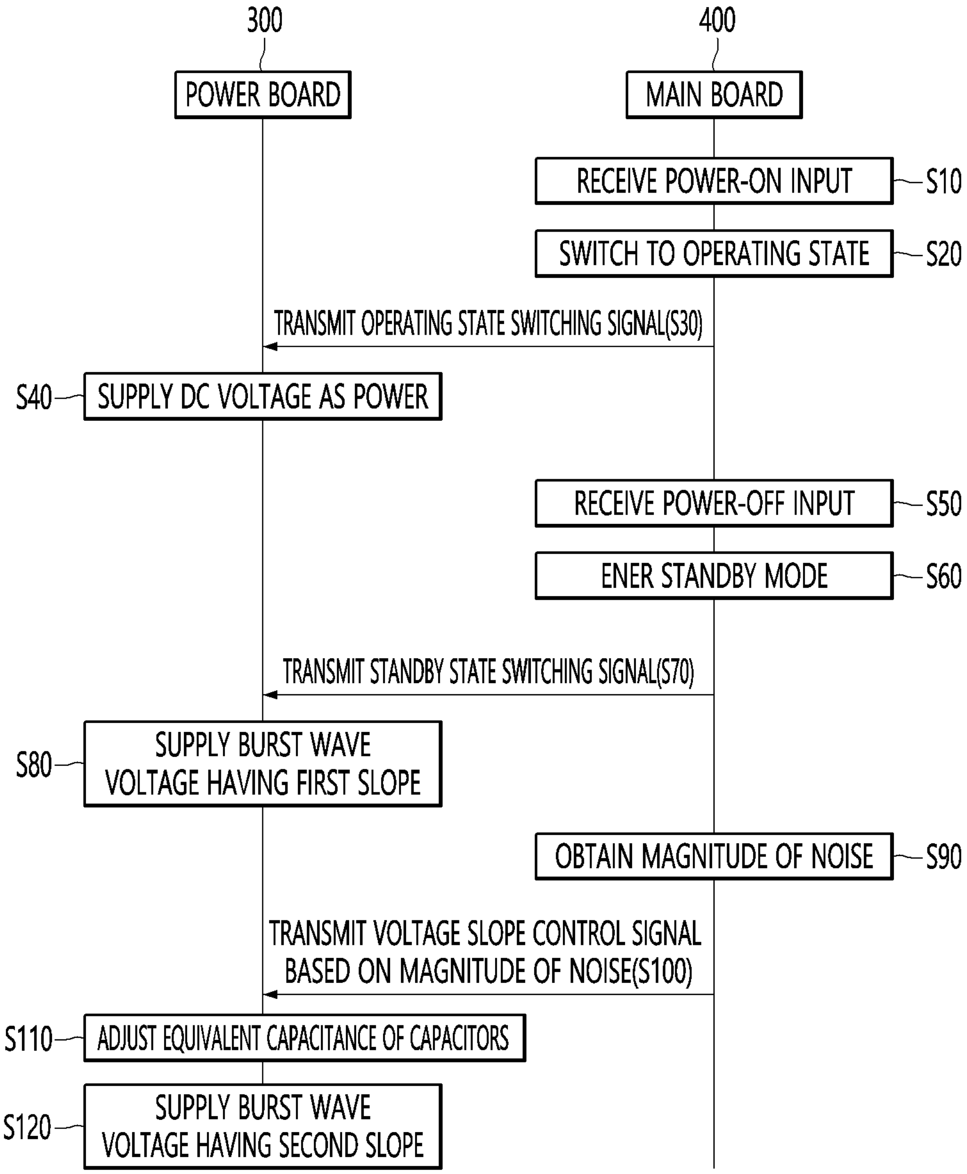

FIG. 13 is a ladder diagram for describing a method of adjusting a slope of a burst wave voltage in a display device according to an embodiment of the present disclosure.

Figure 14:
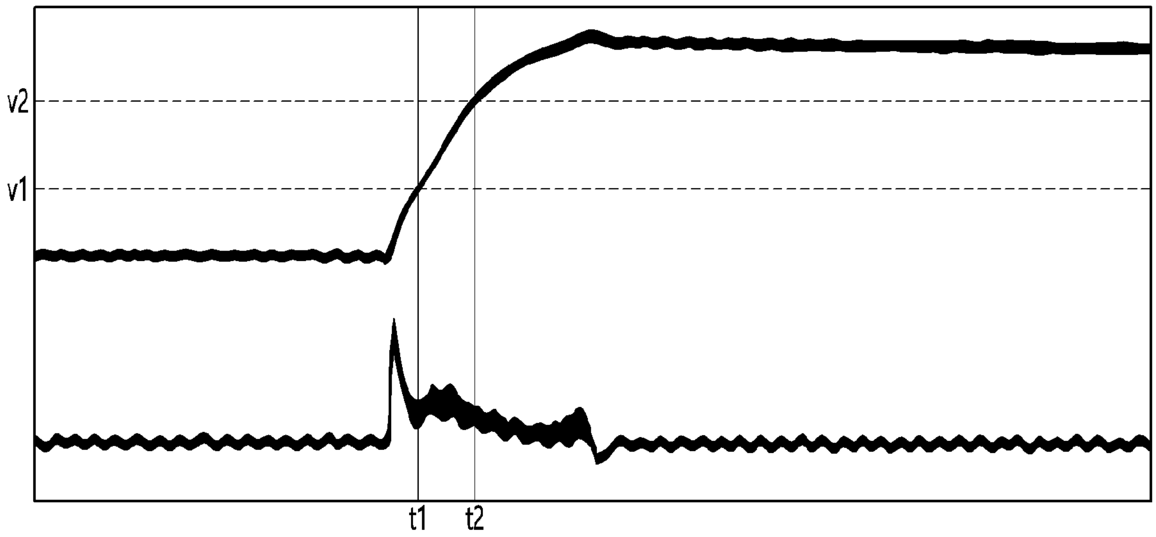

FIG. 14 is a diagram illustrating a waveform of a burst wave voltage having a first slope.

Figure 15:
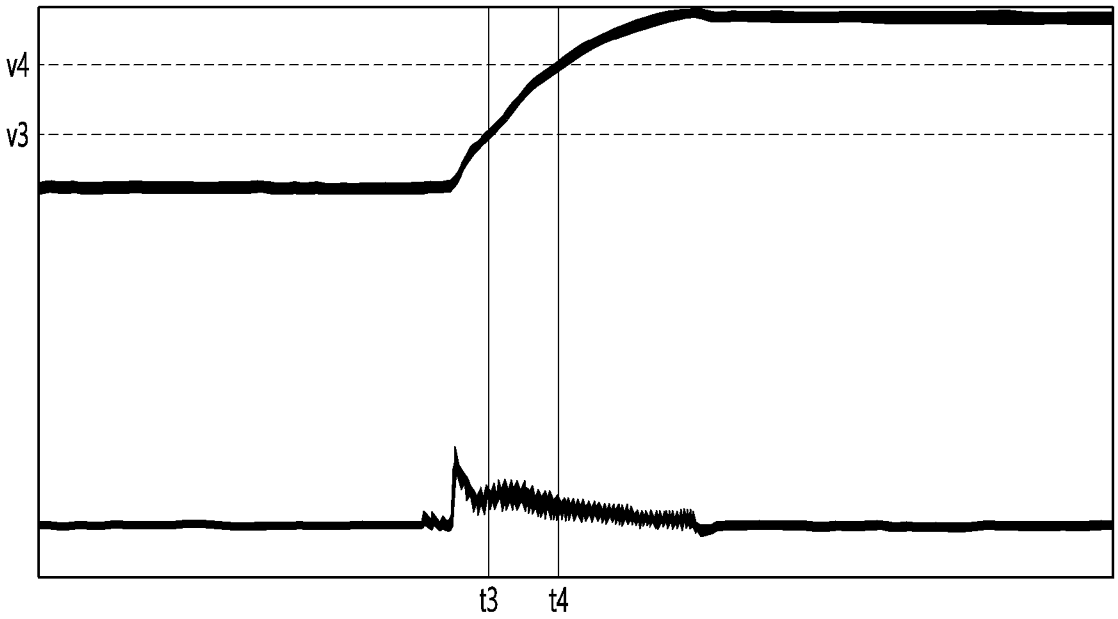

FIG. 15 is a diagram illustrating a waveform of a burst wave voltage having a second slope.

DETAILED DESCRIPTION OF THE PREFERRED EMBODIMENTS

Hereinafter, embodiments of the present disclosure will be described in detail with reference to the drawings. The suffixes “module” and “unit or portion” for components used in the following description are merely provided only for facilitation of preparing this specification, and thus they are not granted a specific meaning or function.

The display device according to an embodiment of the present disclosure is, for example, an intelligent display device in which a computer support function is added to a broadcast reception function, and is faithful to a broadcast reception function and has an Internet function added thereto, such as a handwritten input device, a touch screen Alternatively, a more user-friendly interface such as a spatial remote control may be provided. In addition, it is connected to the Internet and a computer with the support of a wired or wireless Internet function, so that functions such as e-mail, web browsing, banking, or games can also be performed. A standardized general-purpose OS may be used for these various functions.

Accordingly, in the display device described in the present disclosure, various user-friendly functions can be performed because various applications can be freely added or deleted, for example, on a general-purpose OS kernel. More specifically, the display device may be, for example, a network TV, HBBTV, smart TV, LED TV, OLED TV, and the like, and may be applied to a smart phone in some cases.

Figure 1:
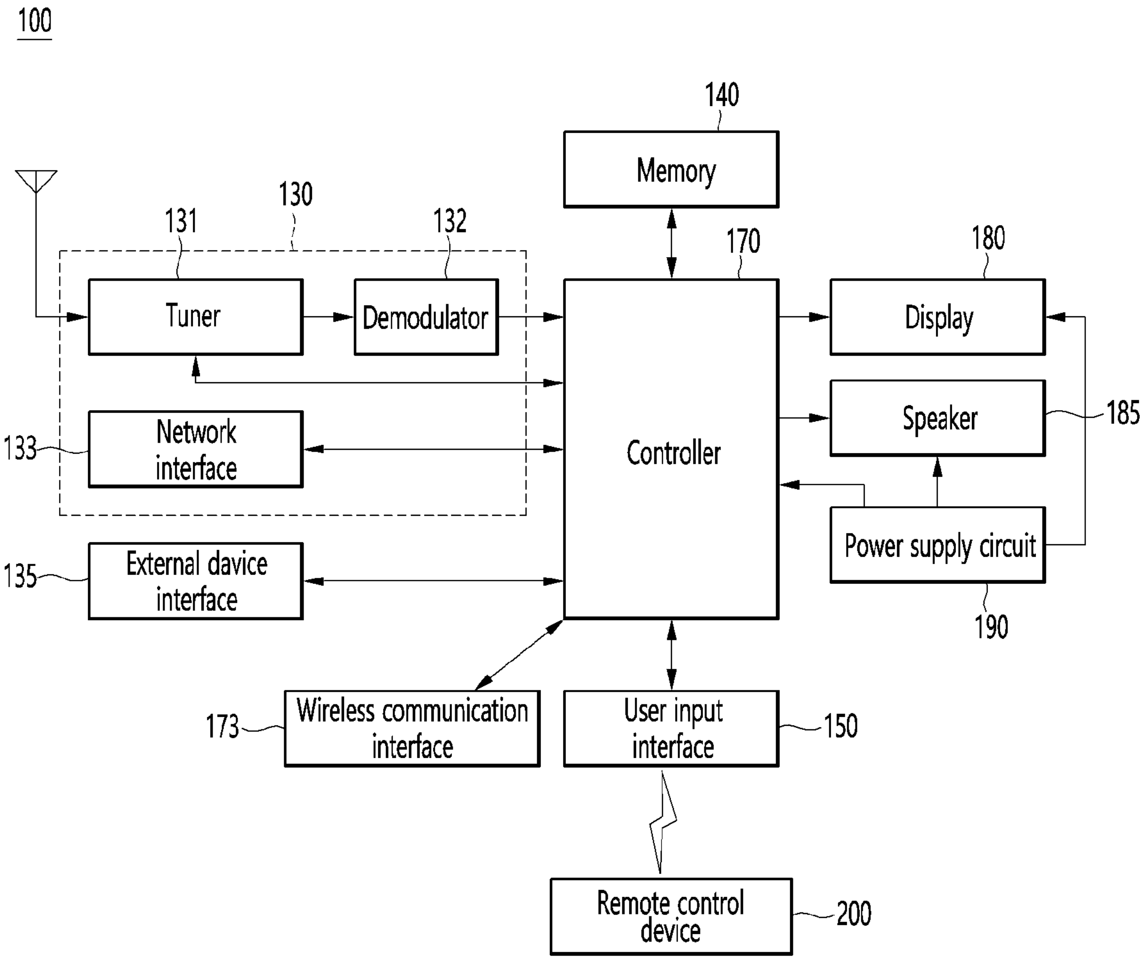
FIG. 1 is a block diagram showing a configuration of a display device according to an embodiment of the present disclosure.

FIG. 1 is a block diagram showing a configuration of a display device according to an embodiment of the present disclosure.

Referring to FIG. 1, a display device 100 may include a broadcast receiver 130, an external device interface 135, a memory 140, a user input interface 150, a controller 170, a wireless communication interface 173, a display 180, a speaker 185, and a power supply circuit 190.

The broadcast receiving unit 130 may include a tuner 131, a demodulator 132, and a network interface 133.

The tuner 131 may select a specific broadcast channel according to a channel selection command. The tuner 131 may receive a broadcast signal for the selected specific broadcast channel.

The demodulator 132 may separate the received broadcast signal into an image signal, an audio signal, and a data signal related to a broadcast program, and restore the separated image signal, audio signal, and data signal to a format capable of being output.

The external device interface 135 may receive an application or a list of applications in an external device adjacent thereto, and transmit the same to the controller 170 or the memory 140.

The external device interface 135 may provide a connection path between the display device 100 and an external device. The external device interface 135 may receive one or more of images and audio output from an external device connected to the display device 100 in a wired or wireless manner, and transmit the same to the controller 170. The external device interface 135 may include a plurality of external input terminals. The plurality of external input terminals may include an RGB terminal, one or more High Definition Multimedia Interface (HDMI) terminals, and a component terminal.

The image signal of the external device input through the external device interface unit 135 may be output through the display 180. The audio signal of the external device input through the external device interface 135 may be output through the speaker 185.

The external device connectable to the external device interface 135 may be any one of a set-top box, a Blu-ray player, a DVD player, a game machine, a sound bar, a smartphone, a PC, a USB memory, and a home theater, but this is only an example.

The network interface 133 may provide an interface for connecting the display device 100 to a wired/wireless network including an Internet network. The network interface 133 may transmit or receive data to or from other users or other electronic devices through a connected network or another network linked to the connected network.

In addition, a part of content data stored in the display device 100 may be transmitted to a selected user among a selected user or a selected electronic device among other users or other electronic devices registered in advance in the display device 100.

The network interface 133 may access a predetermined web page through the connected network or the other network linked to the connected network. That is, it is possible to access a predetermined web page through a network, and transmit or receive data to or from a corresponding server.

In addition, the network interface 133 may receive content or data provided by a content provider or a network operator. That is, the network interface 133 may receive content such as movies, advertisements, games, VOD, and broadcast signals and information related thereto provided from a content provider or a network provider through a network.

In addition, the network interface 133 may receive update information and update files of firmware provided by the network operator, and may transmit data to an Internet or content provider or a network operator.

The network interface 133 may select and receive a desired application from among applications that are open to the public through a network.

The memory 140 may store programs for signal processing and control of the controller 170, and may store images, audio, or data signals, which have been subjected to signal-processed.

In addition, the memory 140 may perform a function for temporarily storing images, audio, or data signals input from an external device interface 135 or the network interface 133, and store information on a predetermined image through a channel storage function.

The memory 140 may store an application or a list of applications input from the external device interface 135 or the network interface 133.

The display device 100 may play back a content file (a moving image file, a still image file, a music file, a document file, an application file, or the like) stored in the memory 140 and provide the same to the user.

The user input interface 150 may transmit a signal input by the user to the controller 170 or a signal from the controller 170 to the user. For example, the user input interface 150 may receive and process a control signal such as power on/off, channel selection, screen settings, and the like from the remote control device 200 in accordance with various communication methods, such as a Bluetooth communication method, a WB (Ultra Wideband) communication method, a ZigBee communication method, an RF (Radio Frequency) communication method, or an infrared (IR) communication method or may perform processing to transmit the control signal from the controller 170 to the remote control device 200.

In addition, the user input interface 150 may transmit a control signal input from a local key (not shown) such as a power key, a channel key, a volume key, and a setting value to the controller 170.

The image signal image-processed by the controller 170 may be input to the display 180 and displayed as an image corresponding to a corresponding image signal. Also, the image signal image-processed by the controller 170 may be input to an external output device through the external device interface 135.

The audio signal processed by the controller 170 may be output to the speaker 185. Also, the audio signal processed by the controller 170 may be input to the external output device through the external device interface 135.

In addition, the controller 170 may control the overall operation of the display device 100.

In addition, the controller 170 may control the display device 100 by a user command input through the user input interface 150 or an internal program and connect to a network to download an application a list of applications or applications desired by the user to the display device 100.

The controller 170 may allow the channel information or the like selected by the user to be output through the display 180 or the speaker 185 along with the processed image or audio signal.

In addition, the controller 170 may output an image signal or an audio signal through the display 180 or the speaker 185, according to a command for playing back an image of an external device through the user input interface 150, the image signal or the audio signal being input from an external device, for example, a camera or a camcorder, through the external device interface 135.

Meanwhile, the controller 170 may allow the display 180 to display an image, for example, allow a broadcast image which is input through the tuner 131 or an external input image which is input through the external device interface 135, an image which is input through the network interface unit or an image which is stored in the memory 140 to be displayed on the display 180. In this case, an image being displayed on the display 180 may be a still image or a moving image, and may be a 2D image or a 3D image.

In addition, the controller 170 may allow content stored in the display device 100, received broadcast content, or external input content input from the outside to be played back, and the content may have various forms such as a broadcast image, an external input image, an audio file, still images, accessed web screens, and document files.

The wireless communication interface 173 may communicate with an external device through wired or wireless communication. The wireless communication interface 173 may perform short range communication with an external device. To this end, the wireless communication interface 173 may support short range communication using at least one of Bluetooth™, Radio Frequency Identification (RFID), Infrared Data Association (IrDA), Ultra Wideband (UWB), ZigBee, Near Field Communication (NFC), Wi-Fi (Wireless-Fidelity), Wi-Fi (Wireless-Fidelity), Wi-Fi Direct, and Wireless USB (Wireless Universal Serial Bus) technologies. The wireless communication interface 173 may support wireless communication between the display device 100 and a wireless communication system, between the display device 100 and another display device 100, or between the display device 100 and a network in which the display device 100 (or an external server) is located through wireless area networks. The wireless area networks may be wireless personal area networks.

Here, the another display device 100 may be a wearable device (e.g., a smartwatch, smart glasses or a head mounted display (HMD), a mobile terminal such as a smart phone, which is able to exchange data (or interwork) with the display device 100 according to the present disclosure. The wireless communication interface 173 may detect (or recognize) a wearable device capable of communication around the display device 100.

Furthermore, when the detected wearable device is an authenticated device to communicate with the display device 100 according to the present disclosure, the controller 170 may transmit at least a portion of data processed by the display device 100 to the wearable device through the wireless communication interface 173. Therefore, a user of the wearable device may use data processed by the display device 100 through the wearable device.

The display 180 may convert image signals, data signals, and OSD signals processed by the controller 170, or image signals or data signals received from the external device interface 135 into R, G, and B signals, and generate drive signals.

Meanwhile, since the display device 100 shown in FIG. 1 is only an embodiment of the present disclosure, some of the illustrated components may be integrated, added, or omitted depending on the specification of the display device 100 that is actually implemented.

That is, two or more components may be combined into one component, or one component may be divided into two or more components as necessary. In addition, a function performed in each block is for describing an embodiment of the present disclosure, and its specific operation or device does not limit the scope of the present disclosure.

According to another embodiment of the present disclosure, unlike the display device 100 shown in FIG. 1, the display device 100 may receive an image through the network interface 133 or the external device interface 135 without a tuner 131 and a demodulator 132 and play back the same.

For example, the display device 100 may be divided into an image processing device, such as a set-top box, for receiving broadcast signals or content according to various network services, and a content playback device that plays back content input from the image processing device.

In this case, an operation method of the display device according to an embodiment of the present disclosure will be described below may be implemented by not only the display device 100 as described with reference to FIG. 1 and but also one of an image processing device such as the separated set-top box and a content playback device including the display 180 the audio output unit 185.

Next, a remote control device according to an embodiment of the present disclosure will be described with reference to FIGS. 2 to 3.

Figure 2:
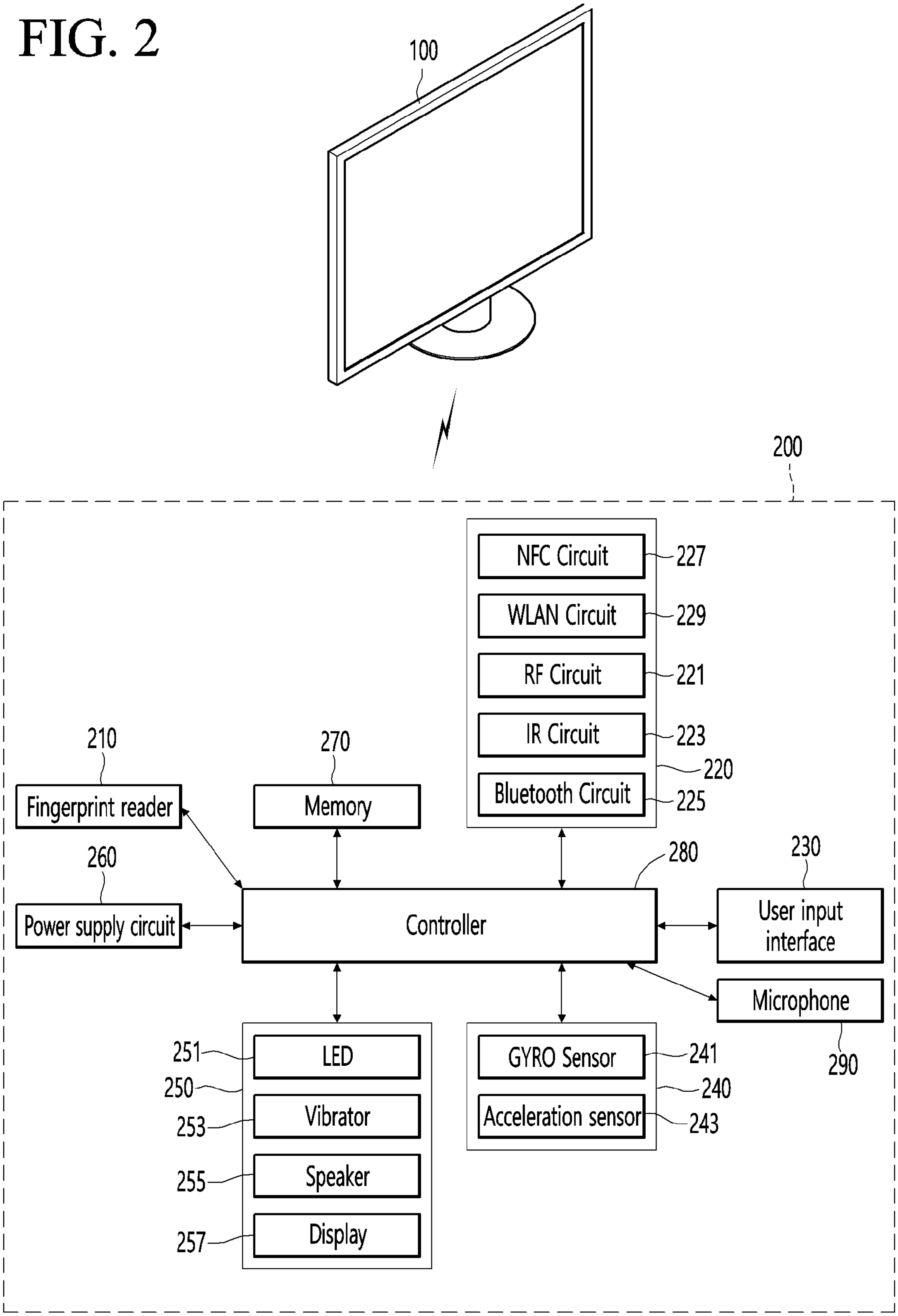
FIG. 2 is a block diagram of a remote control device according to an embodiment of the present disclosure.
Figure 3:
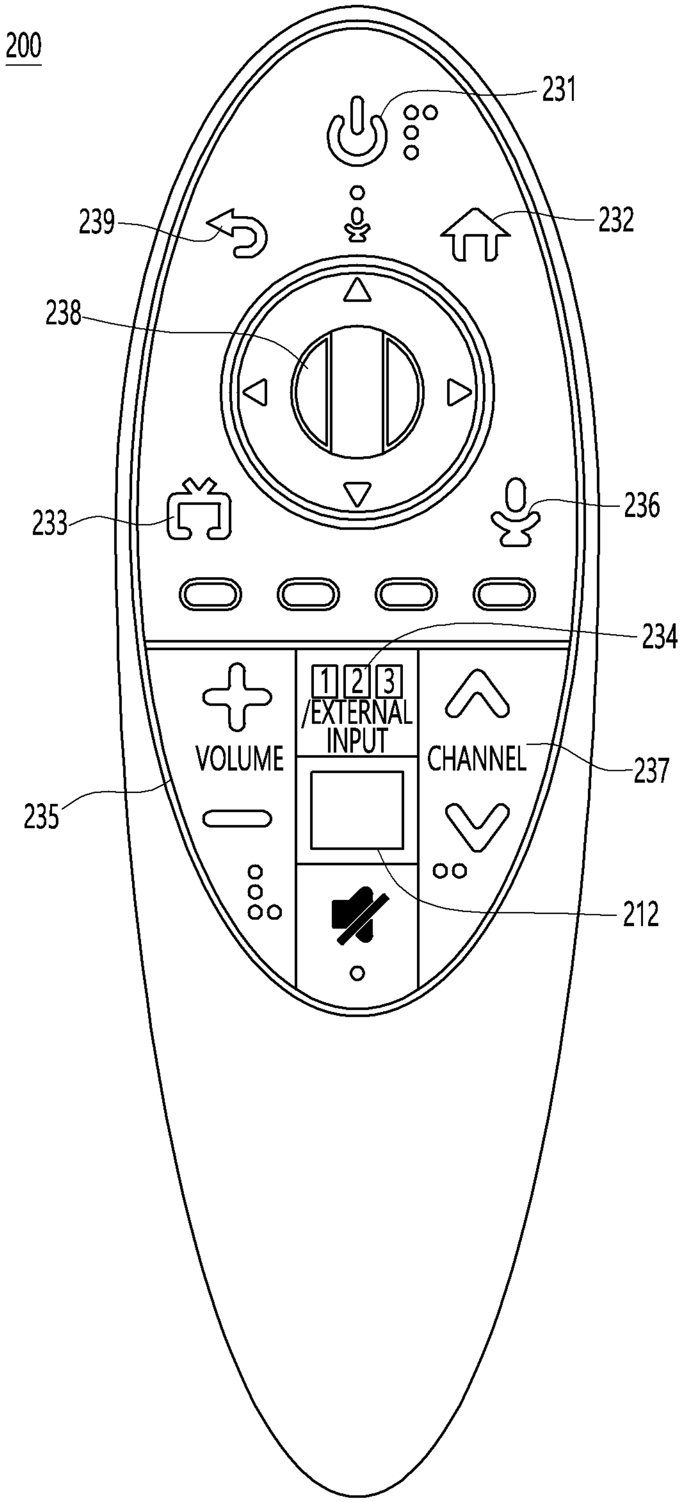
FIG. 3 shows an actual configuration example of a remote control device 200 according to an embodiment of the present disclosure.

FIG. 2 is a block diagram of a remote control device according to an embodiment of the present disclosure, and FIG. 3 shows an actual configuration example of a remote control device 200 according to an embodiment of the present disclosure.

First, referring to FIG. 2, the remote control device 200 may include a fingerprint reader 210, a wireless communication circuit 220, a user input interface 230, a sensor 240, an output interface 250, a power supply circuit 260, a memory 270, a controller 280, and a microphone 290.

Referring to FIG. 2, the wireless communication circuit 220 may transmit and receive signals to and from any one of display devices according to embodiments of the present disclosure described above.

The remote control device 200 may include an RF circuit 221 capable of transmitting and receiving signals to and from the display device 100 according to the RF communication standard, and an IR circuit 223 capable of transmitting and receiving signals to and from the display device 100 according to the IR communication standard. In addition, the remote control device 200 may include a Bluetooth circuit 225 capable of transmitting and receiving signals to and from the display device 100 according to the Bluetooth communication standard. In addition, the remote control device 200 may include an NFC circuit 227 capable of transmitting and receiving signals to and from the display device 100 according to the NFC (near field communication) communication standard, and a WLAN circuit 229 capable of transmitting and receiving signals to and from the display device 100 according to the wireless LAN (WLAN) communication standard.

In addition, the remote control device 200 may transmit a signal containing information on the movement of the remote control device 200 to the display device 100 through the wireless communication circuit 220.

In addition, the remote control device 200 may receive a signal transmitted by the display device 100 through the RF circuit 221, and transmit a command regarding power on/off, channel change, volume adjustment, or the like to the display device 100 through the IR circuit 223 as necessary.

The user input interface 230 may include a keypad, a button, a touch pad, a touch screen, or the like. The user may input a command related to the display device 100 to the remote control device 200 by operating the user input interface 230. When the user input interface 230 includes a hard key button, the user may input a command related to the display device 100 to the remote control device 200 through a push operation of the hard key button. Details will be described with reference to FIG. 3.

Referring to FIG. 3, the remote control device 200 may include a plurality of buttons. The plurality of buttons may include a fingerprint recognition button 212, a power button 231, a home button 232, a live button 233, an external input button 234, a volume control button 235, a voice recognition button 236, a channel change button 237, an OK button 238, and a back-play button 239.

The fingerprint recognition button 212 may be a button for recognizing a user's fingerprint. In one embodiment, the fingerprint recognition button 212 may enable a push operation, and thus may receive a push operation and a fingerprint recognition operation.

The power button 231 may be a button for turning on/off the power of the display device 100.

The home button 232 may be a button for moving to the home screen of the display device 100.

The live button 233 may be a button for displaying a real-time broadcast program.

The external input button 234 may be a button for receiving an external input connected to the display device 100.

The volume control button 235 may be a button for adjusting the level of the volume output by the display device 100.

The voice recognition button 236 may be a button for receiving a user's voice and recognizing the received voice.

The channel change button 237 may be a button for receiving a broadcast signal of a specific broadcast channel.

The OK button 238 may be a button for selecting a specific function, and the back-play button 239 may be a button for returning to a previous screen.

A description will be given referring again to FIG. 2.

When the user input interface 230 includes a touch screen, the user may input a command related to the display device 100 to the remote control device 200 by touching a soft key of the touch screen. In addition, the user input interface 230 may include various types of input means that may be operated by a user, such as a scroll key or a jog key, and the present embodiment does not limit the scope of the present disclosure.

The sensor 240 may include a gyro sensor 241 or an acceleration sensor 243, and the gyro sensor 241 may sense information regarding the movement of the remote control device 200.

For example, the gyro sensor 241 may sense information about the operation of the remote control device 200 based on the x, y, and z axes, and the acceleration sensor 243 may sense information about the moving speed of the remote control device 200. Meanwhile, the remote control device 200 may further include a distance measuring sensor to sense the distance between the display device 100 and the display 180.

The output interface 250 may output an image or audio signal corresponding to the operation of the user input interface 230 or a signal transmitted from the display device 100.

The user may recognize whether the user input interface 230 is operated or whether the display device 100 is controlled through the output interface 250.

For example, the output interface 450 may include an LED 251 that emits light, a vibrator 253 that generates vibration, a speaker 255 that outputs sound, or a display 257 that outputs an image when the user input interface 230 is operated or a signal is transmitted and received to and from the display device 100 through the wireless communication unit 225.

In addition, the power supply circuit 260 may supply power to the remote control device 200, and stop power supply when the remote control device 200 has not moved for a predetermined time to reduce power consumption.

The power supply circuit 260 may restart power supply when a predetermined key provided in the remote control device 200 is operated.

The memory 270 may store various types of programs and application data required for control or operation of the remote control device 200.

When the remote control device 200 transmits and receives signals wirelessly through the display device 100 and the RF circuit 221, the remote control device 200 and the display device 100 transmit and receive signals through a predetermined frequency band.

The controller 280 of the remote control device 200 may store and refer to information on a frequency band capable of wirelessly transmitting and receiving signals to and from the display device 100 paired with the remote control device 200 in the memory 270.

The controller 280 may control all matters related to the control of the remote control device 200. The controller 280 may transmit a signal corresponding to a predetermined key operation of the user input interface 230 or a signal corresponding to the movement of the remote control device 200 sensed by the sensor 240 through the wireless communication unit 225.

Also, the microphone 290 of the remote control device 200 may obtain a speech.

A plurality of microphones 290 may be provided.

Next, FIG. 4 will be described.

Next, a description will be given referring to FIG. 4.

Figure 4:
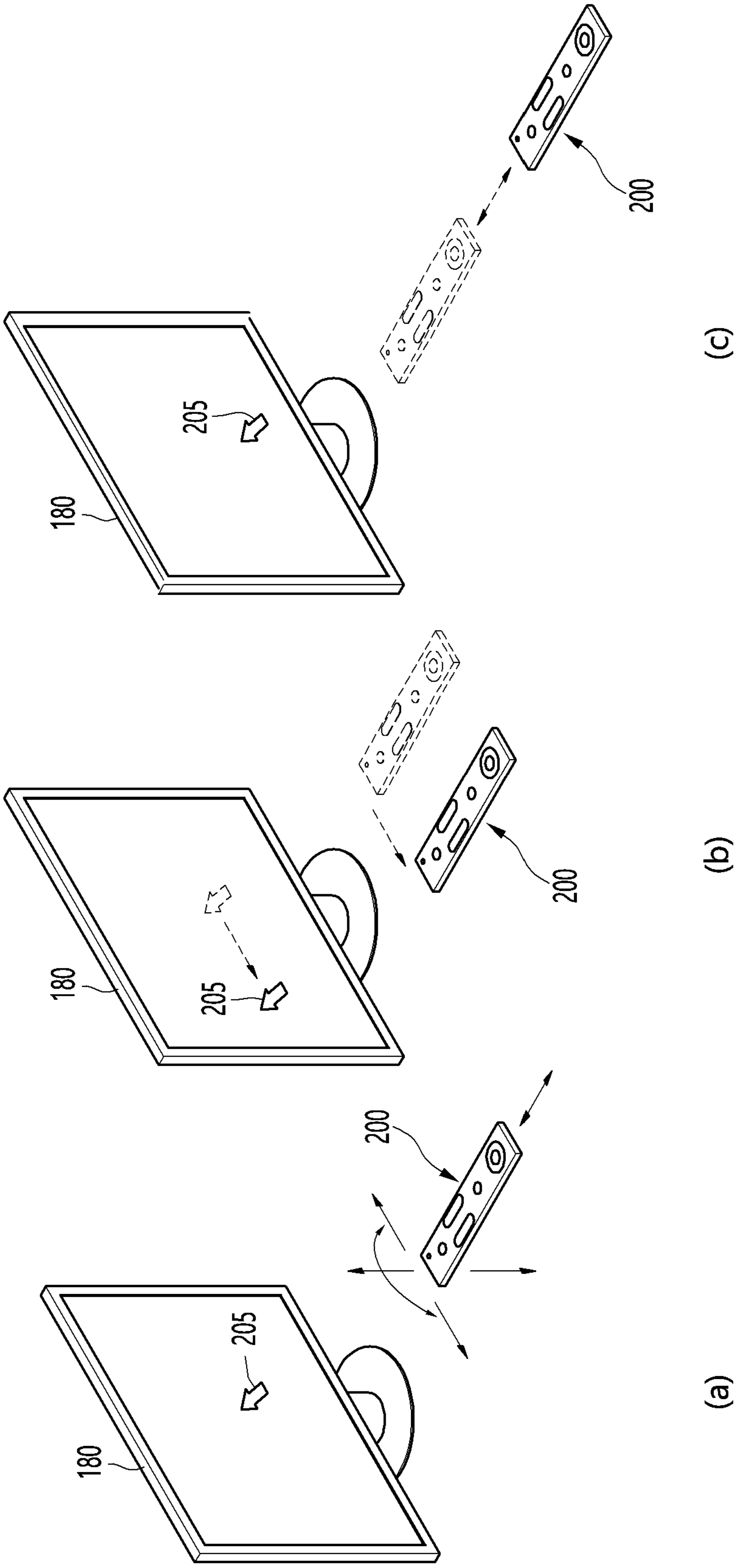
FIG. 4 shows an example of using a remote control device according to an embodiment of the present disclosure.

FIG. 4 shows an example of using a remote control device according to an embodiment of the present disclosure.

In FIG. 4, (a) illustrates that a pointer 205 corresponding to the remote control device 200 is displayed on the display 180.

The user may move or rotate the remote control device 200 up, down, left and right. The pointer 205 displayed on the display 180 of the display device 100 may correspond to the movement of the remote control device 200. As shown in the drawings, the pointer 205 is moved and displayed according to movement of the remote control device 200 in a 3D space, so the remote control device 200 may be called a space remote control device.

In (b) of FIG. 4, it is illustrated that that when the user moves the remote control device 200 to the left, the pointer 205 displayed on the display 180 of the display device 100 moves to the left correspondingly.

Information on the movement of the remote control device 200 detected through a sensor of the remote control device 200 is transmitted to the display device 100. The display device 100 may calculate the coordinates of the pointer 205 based on information on the movement of the remote control device 200. The display device 100 may display the pointer 205 to correspond to the calculated coordinates.

In (c) of FIG. 4, it is illustrated that a user moves the remote control device 200 away from the display 180 while pressing a specific button in the remote control device 200. Accordingly, a selected area in the display 180 corresponding to the pointer 205 may be zoomed in and displayed enlarged.

Conversely, when the user moves the remote control device 200 to be close to the display 180, the selected area in the display 180 corresponding to the pointer 205 may be zoomed out and displayed reduced.

On the other hand, when the remote control device 200 moves away from the display 180, the selected area may be zoomed out, and when the remote control device 200 moves to be close to the display 180, the selected area may be zoomed in.

Also, in a state in which a specific button in the remote control device 200 is being pressed, recognition of up, down, left, or right movements may be excluded. That is, when the remote control device 200 moves away from or close to the display 180, the up, down, left, or right movements are not recognized, and only the forward and backward movements may be recognized. In a state in which a specific button in the remote control device 200 is not being pressed, only the pointer 205 moves according to the up, down, left, or right movements of the remote control device 200.

Meanwhile, the movement speed or the movement direction of the pointer 205 may correspond to the movement speed or the movement direction of the remote control device 200.

Meanwhile, in the present specification, a pointer refers to an object displayed on the display 180 in response to an operation of the remote control device 200. Accordingly, objects of various shapes other than the arrow shape shown in the drawings are possible as the pointer 205. For example, the object may be a concept including a dot, a cursor, a prompt, a thick outline, and the like. In addition, the pointer 205 may be displayed corresponding to any one point among points on a horizontal axis and a vertical axis on the display 180, and may also be displayed corresponding to a plurality of points such as a line and a surface.

The power supply circuit 190 may supply a direct current voltage or a burst wave voltage to the display device 100 as power.

The DC voltage may be a voltage having a constant magnitude. The DC voltage may be a voltage having a linear waveform with a slope of zero.

The burst wave voltage will be described with reference to FIG. 5.

Figure 5:
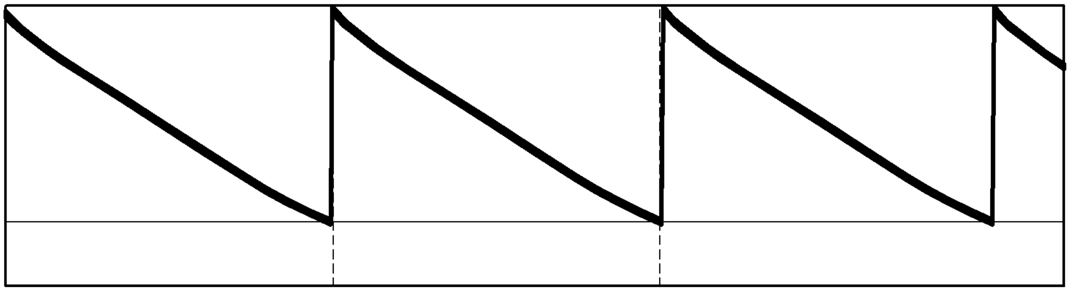

FIG. 5 is a diagram illustrating an example of a waveform of a burst wave voltage of a display device.

As shown in FIG. 5, a burst wave voltage may be a voltage having a burst waveform in which a voltage decreases in proportion to time from an initial voltage value and, when the voltage reaches a predetermined value, rapidly returns to the initial voltage value.

Alternatively, unlike FIG. 5, the burst wave voltage may be a voltage having a burst waveform in which a voltage increases in proportion to time from an initial voltage value and, when the voltage reaches a predetermined value, rapidly returns to the initial voltage value.

The frequency of the burst wave voltage may be 32 Hz. However, this is only an example, and the frequency of the burst wave voltage may vary.

The power supply circuit 190 may supply a direct current voltage or a burst wave voltage according to the state of the display device 100 as power.

The state of the display device 100 may include an operating state and a standby state.

The operating state may be a state in which the display device 100 operates to provide various functions to a user. The operating state may mean a state in which the display device 100 is powered on. When the display device 100 is in an operating state, higher power consumption is required than when the display device 100 is in a standby state, so that the power supply circuit 190 may supply a DC voltage for voltage stability.

The standby state may be a standby state while the user does not use the display device 100. The standby state may mean a state in which the display device 100 is powered off. The burst wave voltage maintains a high voltage value for a shorter time compared to the direct current voltage. Accordingly, when the power supply circuit 190 supplies the burst wave voltage, power consumption may be minimized. When the display device 100 is in an operating state, lower power consumption is required than when the display device 100 is in the operating state, so that the power supply circuit 190 may supply the burst wave voltage to minimize power consumption.

However, when the power supply circuit 190 supplies the burst wave voltage as power, noise of the display device 100 may be caused. The noise caused in this case may be noise due to vibration of a printed circuit board (PCB) inside the display device 100.

The printed circuit board (PCB) may be a substrate on which components or circuits of a main board described below are disposed. For example, components such as a multi-layer ceramic capacitor (MLCC) may be disposed on a PCB.

The components of the main board may operate with power supplied from the power supply circuit 190.

Next, details will be described with reference to FIGS. 6 to 7.

FIG. 6 is a diagram showing how the MLCC is charged or discharged, and FIG. 7 is a diagram showing how the PCB expands or contracts according to whether the MLCC is charged or discharged.

The MLCC 410 may be charged or discharged according to a voltage supplied from the power supply circuit 190.

When the value of the voltage supplied from the power supply circuit 190 of the MLCC 410 is the maximum value, the MLCC 410 may be maximally charged. Conversely, the MLCC 410 may be discharged when the value of the voltage supplied from the power supply circuit 190 is the minimum value.

The left figure of FIG. 6 shows a state in which the MLCC 410 is charged, and the right figure of FIG. 6 shows a state in which the MLCC 410 is discharged.

When the MLCC 410 is maximally charged, the MLCC 410 may have a maximum height. On the other hand, when the MLCC 410 is discharged, the MLCC 410 may have a minimum height.

The MLCC 410 may be repeatedly charged and discharged at the same cycle as the cycle of the burst wave voltage. The MLCC 410 may have a maximum height and a minimum height alternately at the same cycle as the cycle of the burst wave voltage.

The MLCC 410 may be provided on the PCB 420. Accordingly, the PCB 420 may contract or expand according to a change in the height of the MLCC 410.

The left figure of FIG. 7 shows the PCB 420 has expanded, and the right figure of FIG. 7 shows the PCB 420 has contracted.

The PCB 420 may further expand as the height of the MLCC 410 increases.

The PCB 420 may repeatedly expand and contract at the same cycle as the cycle at which the MLCC 410 alternates between the maximum height and the minimum height. The expansion and contraction of the PCB 420 may mean vibration of the PCB 420.

That is, the PCB 420 may vibrate at the same cycle as the cycle of the burst wave voltage.

Due to the vibration of the PCB 420, noise (Acoustic Noise) may be caused.

FIG. 8 is a diagram showing an example of a waveform of noise occurring due to vibration of a PCB.

FIG. 8 is a diagram illustrating a waveform of noise occurring when the power supply circuit 190 supplies a burst wave voltage having a frequency of 32 Hz.

Referring to FIG. 8, the cycle of noise is 32 Hz.

It can be seen that the cycle of the noise is the same as the cycle of the burst wave voltage.

The magnitude of the noise may be 32 dB. However, this is merely an example, and the magnitude of the acoustic noise may vary.

The frequency and magnitude of the noise may vary depending on the designs of the main board 400, such as the size of the PCB 420, the number of layers of the PCB 420, the number of MLCCs 410, the location of the MLCC 410, the type of a fixing member such as a fixing screw or a gap-pad.

An object of the present disclosure is to provide a display device that minimizes noise caused by a burst wave voltage regardless of the designs of the PCB 420.

To this end, the display device 100 according to an embodiment of the present disclosure aims to adjust the slope of the burst wave voltage.

Referring to FIG. 9, the relationship between the slope of the burst wave voltage and the magnitude of noise will be described.

FIG. 9 is a table showing sensitivity evaluation results of noise of the display device according to the slope of the burst wave voltage.

The noise sensitivity evaluation may indicate a magnitude of noise subjectively felt by a user as a score.

The higher the sensitivity evaluation score, the greater the perception of noise. For example, when the sensitivity evaluation score is 1, it may mean "Noise is perceived at all", when the sensitivity evaluation score is 2, it may mean "Noise is perceived weakly", when the sensitivity evaluation score is 3, it may mean "Noise is perceived", when the sensitivity evaluation score is 4, it may mean "Noise is well perceived", and when the sensitivity evaluation score is 5, it may mean "Noise is very well perceived".

Referring to FIG. 9, when the slope of the burst wave voltage is 0.428 V/ms, the sensitivity evaluation score may be 1.2. In addition, when the slope of the burst wave voltage is 5.179 V/ms, the sensitivity evaluation score may be 4.3.

From this, it can be seen that the higher the slope of the burst wave voltage, the higher the sensitivity evaluation score. That is, it can be seen that the greater the slope of the burst wave voltage, the greater the perceived noise.

Using this, the display device 100 according to an embodiment of the present disclosure may aim to reduce the magnitude of noise by adjusting the slope of the burst wave voltage.

The display device 100 according to an embodiment of the present disclosure may aim to adjust the slope of the burst wave voltage to be smaller as the magnitude of noise increases.

FIG. 10 is a control block diagram of a display device according to an embodiment of the present disclosure.

The display device 100 may include at least some of a power board 300, a main board 400, and a microphone 500.

The power board 300 may be a power supply circuit 190. The power board 300 may supply power to the main board 400.

The power board 300 may have a form in which other components are disposed on the PCB 420.

The power board 300 may include at least some of a power controller 310, a plurality of switches 320 and a plurality of capacitors 330.

The power controller 310 may be a controller for controlling power supply of the power board 300. The power controller 310 may control on/off of the plurality of switches 320 to be described later. The power controller 310 may be a microcomputer (Micom), but is not limited thereto.

The plurality of switches 320 may be switches connected to at least some of the plurality of capacitors 330.

The plurality of capacitors 330 may be capacitors provided at an output terminal of the power board 300 to adjust the slope of the burst wave voltage supplied by the power board 300.

The main board 400 may control overall operations within the display device 100. The type of the main board 400 may vary depending on the type of a System On Chip (SoC), a manufacturer, a board size, and the like.

The main board 400 may include at least some of the controller 170, the PCB 420 and the MLCC 410.

The controller 170 may be implemented in the form of an SoC. According to embodiments, the controller 170 may serve as the power controller 310.

The MLCC 410 may be provided on the PCB 420 to stabilize power or reduce power. The MLCC 410 may store power supplied from the power board 300 and supply the stored power to other components. There may be one type of MLCC 410 or a plurality of types of MLCCs 410.

The microphone 500 may sense internal or external noise of the display device 100. The microphone 500 may sense noise caused due to the vibration of the PCB 420.

Next, the plurality of switches 320 and the plurality of capacitors 330 of the display device 100 according to an embodiment of the present disclosure will be described in detail with reference to FIGS. 11 and 12.

First, the arrangement of the plurality of switches 320 and the plurality of capacitors 330 will be described with reference to FIG. 11.

FIG. 11 is a diagram illustrating arrangement of a plurality of switches and a plurality of capacitors of a display device according to an embodiment of the present disclosure.

A power board 300 may include a plurality of switches 320 and a plurality of capacitors 330 for adjusting the slope of a burst wave voltage.

The plurality of switches 320 may include a first switch 321, a second switch 322 and a third switch 323. However, this is only an example and the number of switches 320 may vary.

The plurality of capacitors 330 may include a first capacitor 331, a second capacitor 332, a third capacitor 323, and a fourth capacitor 324. It is noted that this is only an example and the number of capacitors 330 may vary.

Each of the plurality of capacitors 330 may be disposed in parallel with the output terminal Vo of the power board 300.

The power supply circuit 190 may output a DC voltage with a voltage value of 13.2V or a burst wave voltage to the output terminal Vo. It is noted that the voltage value of the voltage output to the output terminal Vo is not limited to 13.2V.

Also, each of the plurality of capacitors 330 may be connected to at least one of the plurality of switches 320.

Each of the plurality of switches 320 may be connected between two capacitors.

The first switch 321 may be connected between the first capacitor 331 and the second capacitor 332. The second switch 322 may be connected between the second capacitor 332 and the third capacitor 333. The third switch 323 may be connected between the third capacitor 333 and the fourth capacitor 334.

One end of the first capacitor 331 may be connected between the output terminal Vo of the power supply circuit 190 and the first switch 321, and the other end may be connected to the ground. One end of the second capacitor 332 may be connected between the first switch 321 and the second switch 322, and the other end may be connected to the ground. One end of the third capacitor 333 may be connected between the second switch 322 and the third switch 323, and the other end may be connected to the ground. One end of the fourth capacitor 334 may be connected to one end of the third switch 323 and the other end may be connected to the ground.

It is noted that the arrangement of the plurality of switches 320 and the plurality of capacitors 330 in FIG. 11 is only an example, and all arrangements may be possible in the range in which the switch 320 is selectively short or open between the capacitor 330 and the output terminal Vo.

FIG. 12 is a table showing equivalent capacitances of a plurality of capacitors according to the on or off of each of a plurality of switches.

FIG. 12 is a table showing equivalent capacitances of the plurality of capacitors 330 according to the on/off of each of the plurality of switches 320 shown in FIG. 11.

The capacitance of each of the plurality of capacitors 330 may be 470 μF. It is noted that this is merely an example, and the capacitance of each of the plurality of capacitors 330 may vary.

When all of the first to third switches 321, 322, and 323 are turned off, the equivalent capacitance of the capacitors 330 may be 470 μF.

When the first switch 321 is turned on and the second and third switches 322 and 323 are turned off, the equivalent capacitance of the capacitors 330 may be 940 μF.

When the first and second switches 321 and 322 are turned on and the third switch 323 is turned off, the equivalent capacitance of the capacitors 330 may be 1410 μF.

When all of the first to third switches 321, 322, and 323 are turned on, the equivalent capacitance of the capacitors 330 may be 1880 μF.

The equivalent capacitance of the capacitors 330 may be greater when all of the plurality of switches 320 are turned on than when all of the plurality of switches 320 are turned off.

The equivalent capacitance of the capacitors 330 may be inversely proportional to the slope of the voltage. Therefore, as the equivalent capacitance of the capacitors 330 increases, the slope of the burst wave voltage output from the output terminal Vo may decrease.

The slope of the burst wave voltage may be smaller when all of the plurality of switches 320 are turned on than when all of the plurality of switches 320 are turned off.

Using this principle, the display device 100 according to an embodiment of the present disclosure may adjust the slope of the burst wave voltage by adjusting the equivalent capacitance of the plurality of capacitors 330.

Next, a method for adjusting the slope of a burst wave voltage in the display device 100 according to an embodiment of the present disclosure will be described in detail.

FIG. 13 is a ladder diagram for describing a method of adjusting a slope of a burst wave voltage in a display device according to an embodiment of the present disclosure.

When receiving a power-on input (S10), the main board 400 may switch the display device 100 to an operating state (S20).

When the controller 170 receives an input for powering on the display device 100 while the display device 100 is powered off, the controller 170 may switch the display device 100 into an operating state.

Accordingly, the display device 100 may provide a service to the user, such as outputting content using the display 180 and the speaker 185.

The main board 400 may transmit an operating state switching signal to the power board 300 (S30).

The controller 170 may transmit, to the power controller 310, a signal indicating that the display device 100 has been switched to an operating state.

The power board 300 may supply a DC voltage to the main board 400 as power (S40).

The power board 300 may supply a direct current voltage to the main board 400 as power when receiving the operating state switching signal. For example, the power board 300 may supply a DC voltage of 13.2V as power.

When the main board 400 receives an input for turning off the power (S50), the main board 400 may switch the display device 100 to a standby state (S60).

When receiving an input for turning off the power while the display device 100 is powered on, the controller 170 may switch the display device 100 to a standby state.

Accordingly, the display device 100 may stop output of the display 180 and the speaker 185.

The main board 400 may transmit a standby state switching signal to the power board 300 (S70).

The controller 170 may transmit, to the power controller 310, a signal indicating that the display device 100 has been switched to a standby state.

The power board 300 may supply a burst wave voltage having a first slope to the main board 400 (S80).

The power board 300 may supply a burst wave voltage having a first slope to the main board 400 when receiving the standby state switching signal.

In relation to this, details will be described with reference to FIG. 14.

FIG. 14 is a diagram illustrating a waveform of a burst wave voltage having a first slope.

FIG. 14 may be a diagram illustrating a slope of a burst wave voltage when the equivalent capacitance of the capacitors 330 is 470 μF.

The slope of the burst wave voltage may be a rate of change of a voltage over time.

The first slope may be (v2−v1)/(t2−t1). For example, the first slope may be 5.18V/ms.

When the slope of the burst wave voltage is 5.18 V/ms, the sensitivity evaluation score may be 4.3 points. The sensitivity evaluation score of 4.3 points may mean that the user feels that the magnitude of noise is "very well perceived".

Again, description will be given with reference to FIG. 13.

The main board 300 may obtain the magnitude of noise (S90).

The controller 170 may obtain the magnitude of noise obtained by the microphone 500.

The microphone 500 may obtain the noise of the display device 100 when the display device 100 switches to a standby state. Alternatively, the microphone 500 may periodically obtain the noise of the display device 100.

The noise of the display device 100 may include internal noise of the display device 100. The internal noise of the display device 100 may include noise due to vibration of the PCB 420.

The controller 170 may receive noise-related data from the microphone 500 and obtained the received magnitude of the noise. The noise-related data may include an audio signal in which noise is recorded, or the like.

The controller 170 may obtain the magnitude of noise when the display device 100 is switched to a standby state. Alternatively, the controller 170 may periodically obtain the magnitude of noise.

When the controller 170 periodically obtains the magnitude of noise, the display device 100 may operate in response to a change in the magnitude of noise after the display device 100 has switched to a standby state.

The main board 400 may transmit a voltage slope control signal to the power board 300 based on the obtained magnitude of noise (S100).

The voltage slope control signal may be a signal for adjusting the slope of the burst wave voltage to a slope smaller than the current slope.

The controller 170 may transmit a voltage slope control signal to the power controller 310 based on whether the obtained magnitude of noise is greater than or equal to a preset reference magnitude.

The controller 170 may obtain whether the magnitude of noise is greater than or equal to a preset reference magnitude.

The preset reference magnitude may be a magnitude determined in consideration of the sensitivity evaluation result.

For example, the preset reference magnitude may be a reference magnitude corresponding to 3 points that the user feels as "noise is perceived". When the user gives 3 points, the magnitude of noise may be 32 dB. Accordingly, the preset reference magnitude may be set to 32 dB. However, a method of setting the reference magnitude may be performed in various manners.

The controller 170 may transmit a voltage slope control signal to the power controller 310 when it is determined that the magnitude of noise is greater than or equal to the preset reference magnitude.

The controller 170 may adjust the slope of the burst wave voltage to a second slope smaller than a first slope when the magnitude of noise obtained while a burst wave voltage having the first slope is being supplied is greater than or equal to the preset reference magnitude.

Meanwhile, the controller 170 may not transmit a voltage slope control signal to the power controller 310 when it is determined that the magnitude of noise is less than the preset reference magnitude.

When it is determined that the magnitude of noise is less than the preset reference magnitude, the controller 170 may continuously obtain the magnitude of noise.

When receiving the voltage slope control signal, the power board 300 may adjust the equivalent capacitance of capacitors (S110).

The power controller 310 may adjust the equivalent capacitance of the capacitors 330 by controlling each of the plurality of switches 320 based on the received voltage slope control signal.

The equivalent capacitance of the capacitors 330 may include a first capacitance and a second capacitance.

The power controller 310 may adjust the equivalent capacitance of the capacitors 330 to the second capacitance greater than the first capacitance when a voltage slope control signal is received while outputting the burst wave voltage with the first capacitance.

That is, the controller 170 adjust the equivalent capacitance of the capacitors to the second capacitance greater than the first capacitance when the magnitude of the noise obtained while the equivalent capacitance of the capacitors is the first capacitance is equal to or greater than the preset reference magnitude.

When the equivalent capacitance of the capacitors 330 is the first capacitance, the burst wave voltage may have a first slope. Also, when the equivalent capacitance of the capacitors 330 is the second capacitance greater than the first capacitance, the burst wave voltage may have a second slope smaller than the first slope.

The power board 300 may supply a burst wave voltage having the second slope (S120).

The power board 300 may supply a burst wave voltage having the second slope to the main board 400.

For example, the power controller 310 may turn on the first and second switches 321 and 322 to adjust the equivalent capacitance of the capacitors 330 to 1410 μF, and supply a burst wave voltage having the second slope.

In relation to this, details will be described with reference to FIG. 15.

FIG. 15 is a diagram illustrating a waveform of a burst wave voltage having a second slope.

FIG. 15 may be a diagram illustrating a slope of a burst wave voltage when the equivalent capacitance of the capacitor 330 is 1410 μF.

The second slope may be (v4−v3)/(t4−t3).

For example, the second slope may be 3.03V/ms. When the slope of the burst wave voltage is 3.03 V/ms, the sensitivity evaluation score may be 2.0. The sensitivity evaluation score of 2.0 may mean that the user feels that the magnitude of noise "is perceived weakly".

When the power board 300 supplies the burst wave voltage having the second slope as shown in FIG. 15, the sensitivity evaluation score may be lower than that of a case where the power board 300 supplies the burst wave voltage having the first slope as shown in FIG. 14.

That is, the magnitude of noise of the display device 100 perceived by the user may be significantly reduced. This may mean that the magnitude of actual noise of the display device 100 is significantly reduced.

Summarizing FIG. 13, when the display device 100 according to an embodiment of the present disclosure has switched to a standby state, the display device 100 may obtain the magnitude of noise and reduce the magnitude of noise by adjusting the slope of a burst wave voltage.

In addition, the display device 100 according to an embodiment of the present disclosure may adjust the slope of the burst wave voltage to be smaller as the obtained magnitude of noise increases. To this end, the display device 100 according to an embodiment of the present disclosure may increase the equivalent capacitance of the capacitors 330 as the obtained magnitude of noise increases.

According to an embodiment of the present disclosure, noise occurring in the standby state of the display device 100 may be minimized. Accordingly, inconvenience caused by noise occurring while the user is not using the display device 100 may be minimized.

The slope of the burst wave voltage may be adjusted by classifying the magnitude of the noise of the display device 100 according to an embodiment of the present disclosure into a plurality of sections.

For example, the controller 170 may classify the magnitude of noise into first to fourth magnitude.

Specifically, the controller 170 may turn off all of the plurality of switches 320 when the obtained magnitude of noise is the first magnitude. Accordingly, the equivalent capacitance of the capacitors 330 may be 470 μF.

The controller 170 may turn on the first switch 321 when the obtained magnitude of noise is the second magnitude greater than the first magnitude. Accordingly, the equivalent capacitance of the capacitors 330 may be 940 μF.

The controller 170 may turn on the first switch 321 and the second switch 322 when the obtained magnitude of noise is the third magnitude greater than the second magnitude. Accordingly, the equivalent capacitance of the capacitors 330 may be 1410 μF.

The controller 170 may turn on all of the plurality of switches 320 when the obtained magnitude of noise is the fourth magnitude greater than the third magnitude. Accordingly, the equivalent capacitance of the capacitors 330 may be 1880 μF.

In this way, as the magnitude of the noise is classified into a plurality of sections, the slope of the burst wave waveform may be finely adjusted for each magnitude of the noise.

In addition, since power consumption increases as the equivalent capacitance of the capacitors 330 increases, an effect of minimizing power consumption may be mainly achieved when the magnitude of noise is the first magnitude. In addition, when the magnitude of noise is the fourth magnitude, the effect of minimizing the magnitude of the noise may be mainly achieved.

The display device 100 according to an embodiment of the present disclosure may adjust the slope of the burst wave voltage based on the time elapsed from the time when the display device 100 switches to the standby state.

For example, the controller 170 may adjust the slope of the burst wave voltage to the first slope when receiving the power-off input, and adjust the slope of the burst wave voltage to the second slope smaller than the first slope when a predetermined reference time has elapsed from the time when the power-off input is received.

The reference time may be a time period during which it is estimated that the user will not use the display device 100 again within a predetermined time period. For example, the reference time may be 30 minutes.

Accordingly, the display device 100 according to an embodiment of the present disclosure may minimize the magnitude of noise when it is estimated that the user will not use the display device 100 within a predetermined time period.

The display device 100 according to an embodiment of the present disclosure may adjust the slope of the burst wave voltage based on a time band in which the display device has switched to the standby state.

The time band in which the display device has switched to the standby state may be a time band including a time when a power-off input is received. The time band may be set in various ways by user settings. Alternatively, the time band may be set as a default in the display device 100.

For example, the controller 170 may adjust the slope of the burst wave voltage to the first slope when the time band in which the display device has switched to the standby state is a daytime band. In addition, the controller 170 may adjust the slope of the burst wave voltage to the second slope smaller than the first slope when the time band in which the display device has switched to the standby state is a nighttime band.

That is, the controller 170 may adjust the magnitude of noise to be smaller when the time band in which the display device has switched to the standby state is a nighttime band, than when the time band in which the display device has switched to the standby state is a daytime band.

Accordingly, the display device 100 according to an embodiment of the present disclosure may adjust the magnitude of noise in consideration of the user's life pattern.

According to an embodiment of the present disclosure, the above-described method can be implemented with codes readable by a processor on a medium in which a program is recorded. Examples of the processor-readable medium may include read-only memory (ROM), random access memory (RAM), compact disc read-only memory (CD-ROM), magnetic tape, floppy disk, and optical data storage device.

The display device described above is not limitedly applicable to the configurations and methods of the above-described embodiments, and the embodiments are configured by selectively combining all or part of the embodiments such that various modifications can be made.

What is claimed is:

1. A display device comprising:

a power supply circuit configured to supply a DC voltage or a burst wave voltage to the display device as power;

a microphone configured to sense noise of the display device; and a controller configured to obtain a magnitude of the noise and adjust a slope of the burst wave voltage for the power supply circuit based on the magnitude of the noise, wherein the controller is configured to adjust the slope of the burst wave voltage based on a rate of change of the burst wave voltage from a time when the display device switches to a standby state.

2. The display device of claim 1, wherein the controller is configured to adjust the slope of the burst wave voltage to be smaller as the obtained magnitude of the noise increases.

3. The display device of claim 2, wherein the controller is configured to adjust the slope of the burst wave voltage to a second slope smaller than a first slope when the magnitude of the noise obtained while the burst wave voltage having the first slope is being supplied is equal to or greater than a preset reference magnitude.

4. The display device of claim 1, wherein the power supply circuit includes a plurality of capacitors connected to at least one of a plurality of switches, wherein the controller is configured to adjust the slope of the burst wave voltage by adjusting an equivalent capacitance of the plurality of capacitors.

5. The display device of claim 4, wherein the controller is configured to adjust the equivalent capacitance of the capacitors to be larger as the magnitude of the noise increases.

6. The display device of claim 5, wherein the controller is configured to adjust the equivalent capacitance of the capacitors to a second capacitance greater than a first capacitance when the magnitude of the noise obtained while the equivalent capacitance of the capacitors is the first capacitance is equal to or greater than a preset reference magnitude.

7. The display device of claim 4, wherein the plurality of capacitors include first to fourth capacitors connected in parallel to an output terminal of the power supply circuit, wherein the plurality of switches include a first switch connected between a first capacitor and a second capacitor, a second switch connected between a second capacitor and a third capacitor, and a third switch connected between a third capacitor and a fourth capacitor, and wherein the controller is configured to adjust the equivalent capacitance of the plurality of capacitors by controlling the plurality of switches individually.

8. The display device of claim 7, wherein the controller is configured to:

turn off all of the plurality of switches when the magnitude of the noise is a first magnitude;

turn on the first switch when the magnitude of the noise is a second magnitude greater than the first magnitude;

turn on the first switch and the second switch when the magnitude of the noise is a third magnitude greater than the second magnitude; and turn on all of the plurality of switches when the magnitude of the noise is a fourth magnitude greater than the third magnitude.

9. The display device of claim 1, wherein the controller is configured to adjust the slope of the burst wave voltage to a first slope when a power-off input is received, and adjust the slope of the burst wave voltage to a second slope smaller than the first slope when a predetermined reference time has elapsed from a time when the power-off input is received.

10. The display device of claim 9, wherein the controller is configured to adjust the slope of the burst wave voltage based on a time band in which the power-off input is received.

* * * * *